United States Patent Office 3,031,518
Patented Apr. 24, 1962

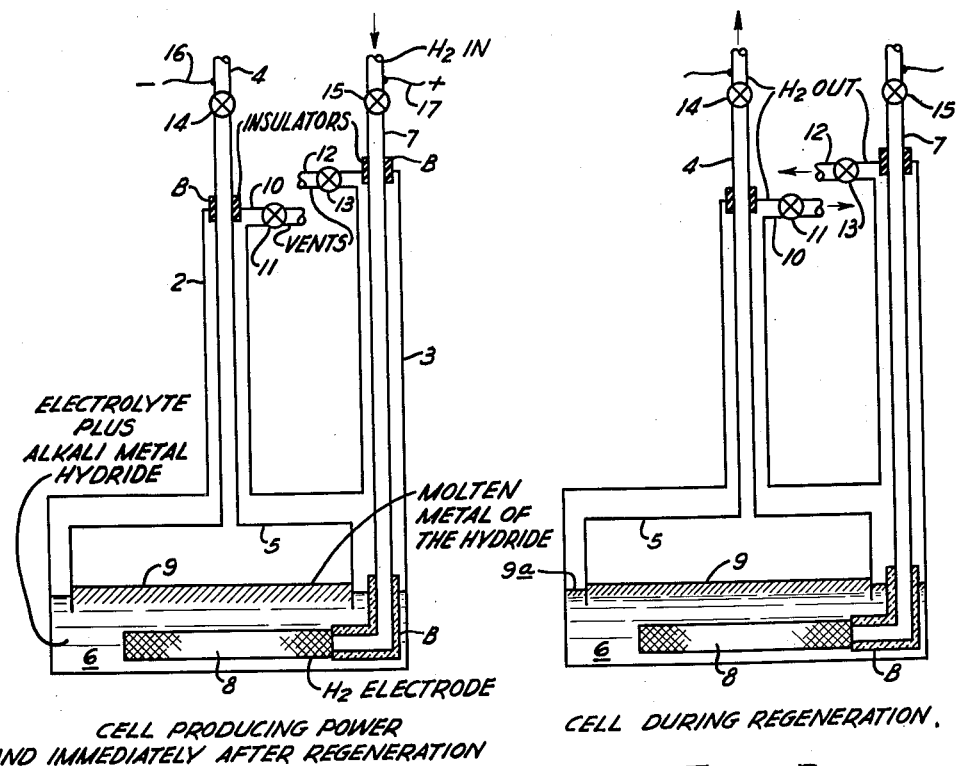
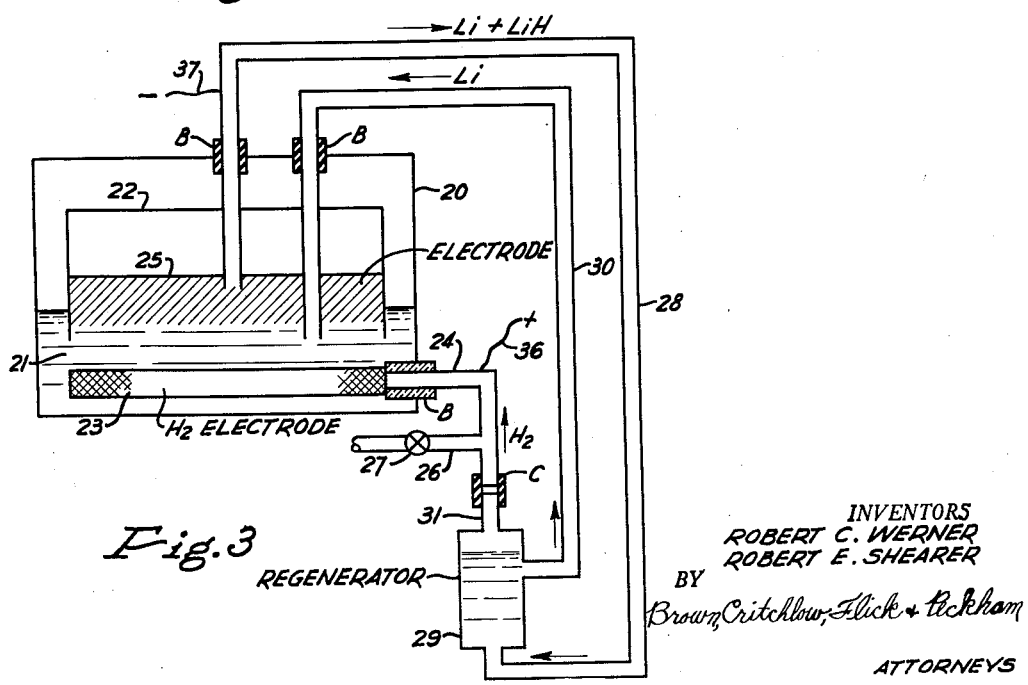

3,031,518
FUEL CELLS
Robert C. Werner, Harmony, and Robert E. Shearer, Edgewood, Pa., assignors, by mesne assignments, to Mine Safety Appliances Company, Pittsburgh, Pa., a corporation of Pennsylvania
Filed July 24, 1959, Ser. No. 829,237
35 Claims. (Cl. 136—86)

This invention relates to fuel cells and in particular it is concerned with the provision of thermally regenerative fuel cells.

Fuel cells of the redox, hydrogen and high temperature gas types have attractive possibilities as sources of electrical energy. Consequently, such devices have been the subject of extensive investigation. However, the known types of fuel cells are subject to a serious disadvantage, namely the inability to regenerate the reactants by a direct, simple and economical method. This factor has militated against commercial development of the known types of fuel cells that require hydrogen or oxygen, or other gaseous fuel such as carbon monoxide. Some of these cells are further disadvantageous in that they must be operated at very high pressures.

It is among the objects of this invention to provide galvanic cells which produce an E.M.F. by the use, as electrodes, of materials the ions of which form a compound that is capable of ready and simple dissociation or decomposition upon the application of heat whereby the original electrode materials are regenerated.

It is another object of the invention to provide cells, in accordance with the foregoing object, that are of simple construction, that can be operated at ambient to moderate pressures, and that are readily regenerated after use.

Electric power is generated in accordance with the present discoveries by providing a cell having two consumable electrodes which, upon operation of the cell, form ions that combine to form a compound which is decomposable by heat at a temperature above the cell operating temperature whereby the electrode materials are regenerated to their original form. One of the electrodes is non-gaseous and is, for example, a metal, a metalloid or a salt, where salt is taken to include compounds formed of a metal and a metalloid, e.g. iron sulfide. In addition to the electrodes, a medium is provided in contact with the electrodes, the medium being in the liquid or fused state at the cell operating conditions and being a solvent for the compound of the ions of the electrode materials. With such an arrangement and the provision of the normal external circuit, current can be drawn from the cell. In this general manner a simple and conveniently regenerable fuel cell for the production of electric current is provided.

The essential internal components of the cells of this invention comprise the electrodes and the solvent. The electrodes in this invention are consumable or sacrificial. By what we intend to indicate that atoms or molecules, as the case may be, of the electrodes are converted to ions, presumably at the interface of the electrode and electrolyte, thereby leaving the former and entering the latter. After a period of operation, the net amount of each electrode remaining as such is depleted—hence the designation of the electrodes as being consumable. The electrodes are further characterized in that the compound formed from the ions of those electrodes upon use of the cell must be capable of thermal regeneration or dissociation to produce the original electrode materials. That is, substantial decomposition or dissociation of the compound formed must be possible at a reasonably attainable temperature whereby the original electrode materials are regenerated. Such decomposition may be substantially quantitative. While regeneration generally is accomplished at a temperature above the cell operating temperature, it also can be accomplished at the same temperature as, or even a lower temperature than, the cell operating temperature by lowering the pressure, relative to the cell pressure, at which regeneration occurs. It is evident that the actual temperature of regeneration is determined by the electrode materials and the particular compound formed therefrom.

From what has been said, it is apparent that in one embodiment, the invention involves temperature cycles in which electricity is produced in the cell at a relatively low temperature with subsequent decomposition of the compound formed at a higher temperature to recover the electrode materials for subsequent recombination and production of electricity at the lower temperature of cell operation. The temperature at which electricity is produced will depend upon the solvent, or electrolyte, for example room temperature in the case of normally liquid solvents. Where salts form the solvent the cell will, of course, be operated at the melting point of the solvent, or somewhat above the melting point, and the temperature at which the cell product is decomposed preferably will be that productive of a dissociation pressure of one atmosphere.

In the preferred embodiments of the invention, the electrode materials, considering them by pairs, exist in different states under the conditions of regeneration. For example, it is desirable that one be a gas or vapor and the other a liquid. This criterion is particularly advantageous to insure ready separation of the regenerated electrode materials, it generally being more efficient to separate a gas from a liquid, for example, than a gas from a gas or a liquid from a liquid. For similar reasons, it is desirable that the electrode materials be relatively insoluble, from a physical point of view, in the solvent at the regeneration conditions so that a minimal problem exists with regard to cycling the electrode materials away from the electrolyte and back to the respective electrodes.

Electrodes conforming to the foregoing requirements can be metal elements and non-metal elements as well as salts and other compounds. In the preferred embodiments however, one electrode in each cell is a metal. Representative electrode reactions of the cells can be postulated according to the following reactions. For a hydride cell:

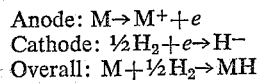

Anode: $M \rightarrow M^+ + e$
Cathode: $\frac{1}{2}H_2 + e \rightarrow H^-$
Overall: $M + \frac{1}{2}H_2 \rightarrow MH$ where M is an alkali or alkaline earth metal, it being understood that appropriate adjustment is to be made here as well as throughout the specification in the quantities represented depending on the valence requirements. An example of an electrode pair for this cell is calcium-hydrogen. For a nitride cell:

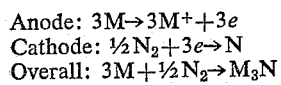

Anode: $3M \rightarrow 3M^+ + 3e$
Cathode: $\frac{1}{2}N_2 + 3e \rightarrow N$
Overall: $3M + \frac{1}{2}N_2 \rightarrow M_3N$ where M is an alkali or alkaline earth metal. An example of an electrode pair for such cells is lithium-nitrogen. The foregoing reactions involve the formation of a simple binary compound from its elements.

Other cells are represented by the following reactions. For a salt electrode cell:

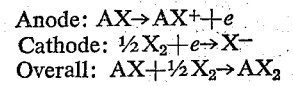

Anode: $AX \rightarrow AX^+ + e$
Cathode: $\frac{1}{2}X_2 + e \rightarrow X^-$
Overall: $AX + \frac{1}{2}X_2 \rightarrow AX_2$ where AX is a metal halide in which the metal, which evidences at least two valence states, is in a lower state of valence and $AX_2$ is the metal halide in which the metal is at a higher state of valence compared to its original state. Cuprous bromide-bromine is an example of an electrode pair for that cell. Other polyvalent halide systems such as

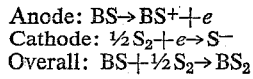

may be used. For a sulfide, telluride or selenide cell, using the sulfide as representative:

Anode: $BS \rightarrow BS^+ + e$
Cathode: $\frac{1}{2}S_2 + e \rightarrow S^-$
Overall: $BS + \frac{1}{2}S_2 \rightarrow BS_2$ where B is a metal such as copper, iron, nickel, molybdenum, indium, cobalt, platinum, or palladium or other metal, such as a transition metal, that forms a sulfide and in which the compound formed involves increasing the amount of the sulfur therein relative to the quantity that exists in the compound when it is in the form used as an anode. A typical electrode pair for this cell system is ferrous sulfide-sulfur.

The foregoing are merely representative of the cells within the scope of the present invention. In addition to halide, sulfide, hydride, telluride, nitride and selenide cells, other cells include oxides of transition metals as well as such oxides as $BaO_2$ which may be formed from BaO and oxygen, using the peroxides of sodium or potassium as solvents.

The tendency of the electrode reactions to occur is measured by the change in free energy of the system, which in turn is a measure of the reversible E.M.F. of the cell. Based upon the free energy changes the theoretical reversible E.M.F. that may be produced can be calculated for standard state conditions.

The solvent electrolyte materials that are used in the cells of the present invention are fused salts and other solvents which characteristically are of high dielectric constant, i.e. in excess of 5 and preferably in excess of 10. These materials are in the liquid or molten state at the cell operating temperature when producing power, although they may exist in any state at normal conditions. For example, ammonia, water, and alkali metal halides, which are, respectively, a gas, a liquid and solids at room temperature, each serve as suitable solvent electrolytes in particular cells of the invention. The solvents are further characterized in that they are capable of solubilizing at least part of the compound formed upon reaction of the ions of the electrodes. The solvent electrolyte can be itself the compound that constitutes the product of reaction of the electrode ions; hence it should be understood that the solubilizing action indicated is inclusive of miscibility. Suitably, the solvents used are essentially inert, that is they do not chemically react with the cell anode and preferably do not dissolve that material to a significant extent.

In view of the requirements, above stated, that determine usable solvent electrolytes for cells of this invention, it is evident that upon establishing the materials that are to serve as electrodes, a suitable solvent electrolyte can be chosen. The solvent electrolyte can be one that is itself ionized or one that is non-ionic, providing that it dissolves at least a portion of the compound formed during cell operation. Examples of particular solvent electrolytes for given cells include metal halides where the cell reaction involves the production of a hydride. Some halides may react with solid electrodes of the alkali and alkaline earth metals to liberate molten metal from the cation of the halide, with resultant lowered E.M.F. output or short-circuiting of the cell. For some purposes, therefore, it is found best to use halides and mixtures of halides of the metal constituting the anode of the cell. The alkali and alkaline earth metal halides and mixtures thereof constitute the preferred solvent electrolyte for the hydride cells. Where it is desirable that the lowest feasible temperature for cell operation be available, it is convenient to use eutectic compositions of such solvent electrolytes. Liquid ammonia can also be used. Where the cell reaction involves the formation of a sulfide, metal sulfides, such, for example, as sodium polysulfide or other alkali metal polysulfides are useful as the solvent electrolyte. In cells using the electrode pair cuprous bromide-bromine, water is a satisfactory solvent as are the fused or molten alkali metal halides. In nitride cells the fused alkali metal and alkaline earth metal halides are satisfactory solvent electrolytes.

Typical cell structures that are in accordance with the invention are shown in the attached drawing in which:

FIG. 1 is a schematic representation of one form of cell embodying the invention.

FIG. 2 is a view similar to FIG. 1 illustrative of the regeneration step when the cell of FIG. 1 is operated in a regenerative cycle; and FIG. 3 is a schematic view of another form of apparatus for continuous, regenerative operation.

Referring now to FIG. 1, the cell 1 comprises a vessel provided with upwardly extending tubular extensions 2 and 3, all of which may, suitably, consist of stainless steel. Mounted within extension 2 is a stainless steel tubular member 4 that terminates in an inverted stainless steel cup 5 the bottom edge of which is immersed, as shown, in a body 6 of a solvent that ionizes the compound formed in the cell, such as described above. The active anode material is placed in this cup; inversion is useful since the anode frequently is molten at operating conditions. For a paste or solid anode, a cage structure (not shown) may be used in place of the cup. Mounted within extension 3 is another stainless steel tubular member 7 the lower end of which 8 constitutes a second electrode, e.g. the hydrogen electrode. This may consist of stainless steel mesh to provide for a high degree of dispersion of hydrogen introduced, as shown, through tube 7. Gas tight electrically insulating bushings B are mounted between tubes 2 and 4, between tubes 3 and 7, and about the portion of tube 7 that is exposed to the electrolyte. Disposed within cup 5 is a body of hydride-forming metal 9. Tubular extension 2 is provided with a vent 10 and a valve 11, and tubular extension 3 may be similarly provided with a vent 12 and a valve 13. Likewise, tube 4 may be provided with a valve 14, and hydrogen inlet tube 7 with a valve 15.

Assuming that the cell of FIG. 1 is to be operated with lithium, that metal will form the electrode 9. The solvent 6 in such a case may consist of 89 mol percent of lithium bromide and 11 mol percent of lithium fluoride, the eutectic composition that melts at about 450° C., at which temperature, the lithium 9 will be molten. Initially, to bring the fuel cell to operating temperature, heat is supplied to the cell according to choice, as from an outside source, by electric resistance, etc. Valves 14 and 15 having been opened and valves 11 and 13 closed, hydrogen is introduced into tube 7 and is passed to the electrode 8 whereupon the electrode reactions given above occur with formation of lithium hydride and generation of an E.M.F. that may be taken off through a negative lead 16 and a positive lead 17. Excess hydrogen, if any, passes from the cell through tubes 4, 10 or 12.

Such a cell will continue to produce power until the lithium has been converted to its hydride. If desired, this cell may be used in a semi-regenerative cycle, as exemplified by FIG. 2. When the time for regeneration arrives valve 15 is closed while valves 11 and 13 are opened, and the electrolyte is heated to the decomposition temperature of lithium hydride, namely about 850° C., by any suitable means, not shown, with conversion of the hydride to hydrogen that passes out of the cell through tubes 4, 10 and 12. The lithium liberated as a result of the decomposition rises to the top of the electrolyte and extends entirely across the cell as well as forming within the cup 5, as seen in FIG. 2. When the decomposition has been completed valve 15 is closed and an inert gas is passed through the vents 10 and 12 whereby the liquid lithium 9a outside of cup 5 is forced within the electrode cup, returning the cell to the condition shown in FIG. 1. When that has been accomplished valves 11 and 13 are closed, the cell is cooled to the operating temperature, i.e., at or somewhat above the eutectic temperature, and valve 15 is opened for re-introduction of hydrogen whereupon generation of E.M.F. is resumed.

A simple form of system for continuous operation and regeneration is illustrated in FIG. 3. This comprises a closed cell 20 containing electrolyte 21 and an inverted cup 22 extending downwardly into the electrolyte where there is disposed a hydrogen electrode 23 that receives hydrogen from a conduit 24 insulated from the cell by a non-conducting bushing B. The hydride-forming metal 25 is in this embodiment carried by the electrolyte within the cup 22.

In initiating operation of such a cell the electrolyte 21 is brought up to temperature by any appropriate means and hydrogen from any suitable source, not shown, is introduced through a branch conduit 26 having a valve 27 whereby to initiate the hydride forming reaction. When the concentration of hydride in the anode metal has become appropriate the regeneration phase of the cycle is begun by withdrawing by convection the metal-metal hydride composition through a conduit 28 that passes it to a closed regenerator 29 that is maintained at least at the decomposition temperature of the hydride. Here the hydride is decomposed with liberation of its metal which is returned by convection to the cell through a conduit 30. The hydrogen released in the regenerator 29 passes to a conduit 31 which is connected to and electrically insulated from conduit 24 by a non-conducting coupling C for return to electrode 23. Conduits 28 and 30 are insulated electrically from the cell by bushings B. Current is taken off through leads 36 and 37. The regenerating system consisting of conduits 28, 30, 31, 24 and regenerator 29, is of course, appropriately thermally insulated. Once the regenerator is in operation, valve 27 is closed and thereafter the cell operates wholly by regeneration of the hydride formed in its operation.

In those embodiments in which solid anode metal is used the solvent will receive the hydride formed, and depending on the particular hydride and solvent it may dissolve in the latter. In either event it is the solvent-hydride composition that is withdrawn for regeneration of the hydride with appropriate return of metal, hydrogen and solvent to the cell. Where the anode is molten the hydride will as a rule be taken up by or dissolved in it, in which case it is this material that may be withdrawn for regeneration.

The invention will be further illustrated by means of the following specific examples in which the physical cell structure used was essentially that as just described. It should be understood that the details disclosed are given by way of illustration.

*Example I*

An example of the results to be had with a hydride cell, a cell was operated that used the electrode pair, calcium-hydrogen, and the eutectic mixture, in mol percent, of 81 percent calcium chloride and 19 percent calcium fluoride heated to about 650° C. as its solvent. Upon the introduction of hydrogen into the cell there was rapid development of an E.M.F. that built up to 0.5 volt in about 50 minutes, and which reached a maximum of about 0.52 volt after 5 hours. Current continued to be developed over a period of somewhat more than 6 hours, at which time introduction of hydrogen into the cell was discontinued followed by replacement by an inert gas. After a brief interval the generation of an E.M.F. ceased. It may be noted that the calcium hydride cell just described can be operated, to obtain power, at temperatures of about 644° to 1000° C. with an efficiency on the order of 35 percent. Regeneration can take place at about 1000° C., the temperature at which a dissociation pressure of one atmosphere exists for calcium hydride.

It is important that moisture be excluded from the hydride cells as well as other cells that do not use an aqueous electrolyte because extraneous reactions such as it might cause are undesirable. For instance, the salts used as solvents should be thoroughly dried to avoid hydrolysis of them with the formation of, for example, alkali or alkaline earth hydroxides, which tend to react with the hydride-forming metals. One way of insuring that the salts are adequately anhydrous is to slowly raise the temperature of the salt or salt mixture to the melting point while passing a slow stream of anhydrous hydrogen halide over it. When thus conditioned the salt is ready for use.

The cell product in every instance is formed at a temperature below its decomposition temperature. Accordingly, in those cells having a gas electrode, high pressures are unnecessary and practice of the invention occurs at atmospheric pressure or only slightly removed therefrom.

*Example II*

Another typical hydride cell is that which involves the formation of lithium hydride. The reactions occurring are:

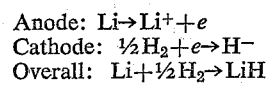

Anode: $Li \rightarrow Li^+ + e$
Cathode: $\frac{1}{2}H_2 + e \rightarrow H^-$
Overall: $Li + \frac{1}{2}H_2 \rightarrow LiH$ The solvent in one instance is a lithium fluoride-lithium chloride eutectic mixture. With the eutectic at 450° C. and hydrogen flowing in the gas electrode, an open circuit voltage of 0.6 volt has been obtained. The fused solvent containing the cell product, LiH, is heated at 850° C. to decompose the hydride. Hydrogen evolves from the solution and the lithium metal and hydrogen are recycled to the cell.

With this cell operating at the maximum power output, specifically at approximately one-half the open circuit voltage, a current density of 150 amp./ft.$^2$ of lithium electrode surface has been obtained. Engineering calculations indicate that a power output on the order of 90 watts per cubic foot can be obtained with this system, excluding considerations such as a heat source and sink.

As noted hereinbefore, electric power can be produced in accordance with the invention upon converting metal sulfides, metal tellurides and metal selenides to a higher proportionate sulfur, tellurium or selenium content by using as a cathode the element corresponding to the anion portion of the anode, i.e. sulfur in the instance of sulfides. Considering the sulfides as representative, typical reactions occurring in producing power in this manner are conceived as follows:

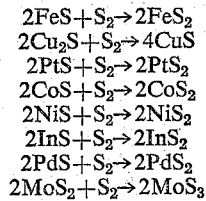

$$2FeS + S_2 \rightarrow 2FeS_2$$
$$2Cu_2S + S_2 \rightarrow 4CuS$$
$$2PtS + S_2 \rightarrow 2PtS_2$$
$$2CoS + S_2 \rightarrow 2CoS_2$$
$$2NiS + S_2 \rightarrow 2NiS_2$$
$$2InS + S_2 \rightarrow 2InS_2$$
$$2PdS + S_2 \rightarrow 2PdS_2$$
$$2MoS_2 + S_2 \rightarrow 2MoS_3$$

A typical operating example in using a sulfide to produce power is as follows:

*Example III*

The solvent used was molten sodium polysulfide obtained in technical grade from Fisher Scientific Company under catalog No. S–426. Stainless steel electrodes were immersed in the molten polysulfide to aid in obtaining contact between the electrolyte and the ferrous sulfide anode and sulfur cathode. The initial operating temperature for the polysulfide was 110° C.

In one test of the cell, with the polysulfide initially at 110° C., the sulfur was fed into contact with the polysulfide while the ferrous sulfide was in place in its stainless steel electrode. At these conditions, an E.M.F. of 0.25 volt was produced. In the absence of the sulfur cathode, but with ferrous sulfide and the stainless steel in contact with the polysulfide, a zero potential was observed, indicating a true E.M.F. based on formation of iron disulfide when sulfur is present. It was also noted that partial solidification in the polysulfide occurred short of an hour's operation of the cell.

The standard free energy of formation of iron disulfide from ferrous sulfide and sulfur is zero at 700° C., indicating a realizable decomposition temperature to regenerate the anode and cathode. By circulating the product iron disulfide contained in the molten sodium polysulfide to a regenerator and heating, the $FeS_2$ is decomposed to gaseous sulfur and ferrous sulfide, which are then returned to their respective electrodes. Of course, the polysulfide is likewise recirculated to the cell.

*Example IV*

In this cell cuprous bromide (CuBr) and bromine ($Br_2$), the anode and cathode respectively, electrochemically form cupric bromide ($BuBr_2$). The electrode reactions are conceived to be as follows:

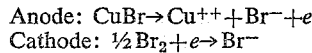

Anode: $CuBr \rightarrow Cu^{++} + Br^- + e$
Cathode: $\frac{1}{2}Br_2 + e \rightarrow Br^-$ The cuprous bromide is used as a paste and is disposed in a porous cup with a conductor immersed in the paste. The bromine is supplied through a convention gas electrode, with bromine vapor passing therethrough to serve as the cathode. In operation, the porous cup containing the cuprous bromide and the outlet end of the gas electrode are placed in contact with water, the solvent in this example.

In one test of this cell, an open circuit voltage of 0.66 volt was obtained. In regenerating this cell the aqueous cupric bromide solution is withdrawn and heated to drive off, in succession, water and then bromine. The water is condensed and returned to the cell; the bromine is returned as vapor or condensate and the cuprous bromide obtained is returned to the porous cup.

As with the other cells, suitable variations may be made without departing from the scope of the invention. For example, fused alkali metal halides can be used as the solvent. Moreover, other copper halides can be the basis for the cell though it is preferred to avoid using the fluorides, especially with an aqueous electrolyte.

Still another type of cell in accordance with the present invention is based upon the formation of alkali metal or alkaline earth metal nitrides. The following is an example of such a cell.

*Example V*

In this cell a eutectic mixture of lithium fluoride and lithium chloride was used as the solvent. A cell structure as shown in FIGURE 1 was used. With the eutectic fused, lithium metal in the anode holder and argon flowing through the gas electrode, a potential of 0.03 volt was observed. Upon changing the gas from argon to nitrogen, whereupon the nitride can form to produce power, the voltage was observed to rise to 0.1 volt. In regeneration of this cell, the entire cell product, i.e. the lithium nitride in the lithium fluoride-lithium chloride eutectic, is circulated to the regenerator vessel for decomposition. Upon applying heat, the nitride is decomposed into lithium and nitrogen, which are returned to their respective electrodes in the cell.

Other alkali and alkaline earth metals can be substituted for the lithium in the foregoing cell. Similarly other solvents can be used in place of the eutectic of lithium fluoride and lithium chloride. It is preferred, however, that the solvent be decomposed of a fused mixture of metal halides in which the metal is the same as the metal electrode of the cell.

The various cells that, in the aggregate, comprise the generic invention are especially useful for particular applications in view of their individual characteristics. For example, relatively high, open-circuit, cell voltage is provided with cells using, as anode and cathode, elements that are far removed from one another in the periodic table. Similarly, the cell operating temperature and the regeneration temperature are dependent on the particular electrodes and solvents used. This latter fact contributes to the unique versatility of the invention. That is, with this invention it is possible to provide a cell, or battery of cells, to operate over a predetermined temperature range within the broad range of say −50° C. to 1500° C.; in other words, applications requiring very low temperatures, those involving high temperatures and those involving varying ranges of temperatures can be met with particular species of the generic invention of this application.

From what has been said it will be understood that practice of this invention involves methods and means for the thermally regenerative production of electric power using a minimum of equipment and with essentially ultimate simplicity. The relatively high efficiency for the production of electrical energy by cells of this invention is indicative of the high promise of the invention. These cells can be used as power sources for applications needing electric power. For example, they may be used in conjunction with conventional automotive power plants, with the heat generated by the use of such power plant being used to regenerate the electrodes as above described. Similarly the cells can be particularly useful in remote areas, for replenishment of the active materials of the cells is not needed and most areas provide heat sources that could be used in the regeneration.

This application is a continuation-in-part of our pending application Serial No. 754,555, filed August 12, 1958, now abandoned.

According to the provisions of the patent statutes, we haxe explained the principle of our invention and have illustrated and described what we now consider to represent its best embodiment. However, we desire to have it understood that, within the scope of the appended claims, the invention may be practiced otherwise than as specifically illustrated and described.

We claim:

1. That method of generating electric current comprising providing a cell containing a metal selected from the group consisting of alkali and alkaline earth metals as one electrode and a second ionizable gaseous electrode, said electrodes combining electrochemically with one another in the use of the cell to form a binary compound which is decomposable at a temperature above the cell operating temperature to regenerate said electrode materials, and an electrolyte in contact with said electrodes that is an inert solvent for said binary compound, and drawing current from said cell at said compound forming temperature.

2. That method of generating electric current comprising providing a cell containing a metal selected from the group consisting of alkali and alkaline earth metals as one electrode and a second ionizable gaseous electrode, said electrodes forming ions in the use of the cell which ions combine with one another to form a binary compound which is decomposable at a temperature above the cell operating temperature to regenerate said electrode materials, and an electrolyte in contact with said electrodes that is an inert solvent for said binary compound, drawing current from said cell at said compound forming temperature whereby said ions of said electrodes combine with one another to form said binary compound, withdrawing said binary compound and heating it to a higher temperature to decompose it into said electrode materials and returning the resulting electrode materials to said cell.

3. That method of producing electric current comprising providing a cell containing as one electrode a metal selected from the group consisting of alkali and alkaline earth metals the hydride of which is ionic, an electrolyte which is an anhydrous inert solvent for and in which said hydride ionizes, and a hydrogen electrode, said electrodes being in contact with said electrolyte, and passing hydrogen from its electrode into said electrolyte at hydride forming temperature whereby said metal is converted to its hydride with development of an E.M.F.

4. A method according to claim 3, said metal being molten.

5. A method according to claim 3, said metal being an alkali metal.

6. A method according to claim 3, said metal being an alkaline earth metal.

7. A method according to claim 3, said metal being calcium, and said electrolyte being the $CaCl_2$—$CaF_2$ eutectic.

8. That method of producing electric current comprising providing a cell containing as one electrode a metal selected from the group consisting of alkali and alkaline earth metals the hydride of which is ionic, an electrolyte which is an anhydrous inert solvent for and in which said hydride ionizes, and a hydrogen electrode, said electrodes being in contact with said electrolyte, said electrolyte being at hydride forming temperature passing hydrogen to said hydrogen electrode whereby said metal is converted to its hydride with development of an E.M.F., withdrawing said hydride and heating it to a temperature higher than the cell operating temperature to decompose it, and returning the resulting hydrogen and metal regenerated by hydride decomposition to their respective electrodes.

9. That method of producing electric current comprising providing a cell containing as an electrode a metal selected from the group consisting of alkali and alkaline earth metals the hydride of which is ionic, a molten electrolyte which is an anhydrous inert solvent for and in which said hydride ionizes, and a hydrogen electrode, said electrodes being in contact with said electrolyte, said electrolyte being at hydride forming temperature passing hydrogen to said hydrogen electrode whereby said metal is converted to its hydride with development of an E.M.F., withdrawing electrolyte carrying said hydride and heating it to a higher temperature that is at least the decomposition temperature of said hydride, whereby said hydride is decomposed into said electrode materials, returning the resulting hydrogen and metal regenerated by hydride decomposition to their respective electrodes, and returning the electrolyte to the cell after cooling it to cell operating temperature.

10. A method according to claim 9, said metal being molten.

11. A method according to claim 9, said metal being an alkali metal.

12. A method according to claim 9, said metal being an alkaline earth metal.

13. A method according to claim 9, said metal being calcium, said electrolyte being the $CaCl_2$—$CaF_2$ eutectic at a temperature of about 644° C., and the hydride carried by the electrolyte being decomposed at about 1000° C.

14. That method of producing electric current comprising providing a cell containing as an electrode a metal selected from the group consisting of alkali and alkaline earth metals the hydride of which is ionic, a molten electrolyte which is an anhydrous inert solvent for and in which said hydride ionizes, and a hydrogen electrode, said electrodes being in contact with said electrolyte, said electrolyte being at hydride forming temperature, passing hydrogen to said hydrogen electrode whereby said metal is converted to its hydride with development of an E.M.F., heating the electrolyte with its contained hydride to decompose said hydride with regeneration of said metal electrode, then cooling the electrolyte while keeping it molten, and resuming passage of hydrogen to the hydrogen electrode.

15. That method of producing electric current comprising providing a cell containing as an electrode a metal selected from the group consisting of alkali and alkaline earth metals the hydride of which is ionic, a molten electrolyte comprising at least one halide of said metal that is not reactive therewith and which is an anhydrous inert solvent for and in which said hydride ionizes, and a hydrogen electrode, said electrodes being in contact with said electrolyte, and passing hydrogen to the hydrogen electrode whereby said metal is converted to its hydride with development of an E.M.F. at hydride forming temperature.

16. A method according to claim 15, said electrolyte being eutectic of halides of said metal.

17. In a galvanic cell the combination of a container, an electrode comprising a metal selected from the group consisting of alkali and alkaline earth metals the hydride of which is ionic, a hydrogen electrode, and an electrolyte in contact with said electrodes which is an anhydrous inert solvent for and in which said hydride ionizes.

18. In a galvanic cell the combination of a container, an electrode comprising a metal selected from the group consisting of alkali and alkaline earth metals the hydride of which is ionic, a hydrogen electrode, and an electrolyte in contact with said electrodes comprising at least one halide of said metal that is not reactive therewith and which is an anhydrous inert solvent for said hydride, and means for heating said electrolyte to the cell operating temperature.

19. In a galvanic cell the combination of a container, an electrode comprising a metal selected from the group consisting of alkali and alkaline earth metals the hydride of which is ionic, a hydrogen electrode, and an electrolyte in contact with said electrodes which is an anhydrous inert solvent for and in which said hydride ionizes, a connection for passing electrolyte carrying said hydride to a container at a higher temperature that is at least the decomposition of said hydride.

20. In a galvanic cell the combination of a container, an electrode comprising a metal selected from the group consisting of alkali and alkaline earth metals the hydride of which is ionic, a hydrogen electrode, and an electrolyte in contact with said electrodes comprising at least one halide of said metal that is not reactive therewith and which is an anhydrous inert solvent for and in which said hydride ionizes, means for heating said electrolyte to the cell operating temperature, a connection for passing electrolyte carrying said hydride to a container at a higher temperature that is at least the decomposition temperature of said hydride, and connections for separately returning electrolyte, metal and hydrogen regenerated by hydride decomposition to the cell.

21. That method of producing electric power comprising providing a cell containing as an anode a metal halide the metal of which evidences at least two valence states and is in a lower state of valence, and a cathode comprising the halogen of said anode, an electrolyte that is an inert solvent for said metal halide when said metal is at a higher state of valence than it is in said anode, said anode and cathode combining electrochemically in the use of the cell to form a binary compound which is decomposable at a temperature above the cell operating temperature to regenerate said anode and cathode, said anode being in contact with said electrolyte, and passing said cathode into said solvent electrolyte whereby an E.M.F. is developed.

22. A method in accordance with claim 21 in which said anode is cuprous bromide and said cathode is bromine.

23. A method in accordance with claim 22 in which said electrolyte is water.

24. A method in accordance with claim 22 in which said electrolyte is an alkali metal halide.

25. A method of producing electric power comprising providing a cell containing as an anode a member selected from the group consisting of alkali and alkaline earth metals, and a nitrogen cathode, and an electrolyte which is an inert solvent for the nitride of said metal of said group, said anode and cathode being in contact wtih said electrolyte, and passing nitrogen from its electrode into said electrolyte whereby an E.M.F. is developed.

26. A method in accordance with claim 25 in which said anode is present in the molten condition.

27. A method in accordance with claim 26 in which said anode is an alkali metal.

28. A method in accordance with claim 25 in which said electrolyte comprises a halide of a member selected from the group consisting of alkali and alkaline earth metals.

29. A method in accordance with claim 28 in which said metal of said electrolyte is the same as the metal electrode in said cell.

30. A method of producing electric power comprising providing a cell containing as an anode a compound selected from the group consisting of metal sulfides, metal telurides and metal selenides, and a cathode which is the same element as the anion portion of the anode, said anode being in a state such that the ions of the cathode and anode in the use of the cell form electrochemically a binary compound in which the anion portion is present in a greater proportionate amount than it exists in said anode, an electrolyte which is an inert solvent for said compound of the ions of said anode and cathode, said anode being in contact with said solvent electrolyte, said binary compound of said anode and cathode being decomposable at a temperature above the cell operating temperature to regenerate the electrode materials, and passing said cathode into said electrolyte at the cell operating temperature whereby an E.M.F. is produced.

31. A method in accordance with claim 30 in which said anode is a sulfide and is selected from the group consisting of FeS, $Cu_2S$, PtS, CoS, NiS, InS, PdS and $MoS_2$.

32. A method in accordance with claim 31 in which said electrolyte is a metal polysulfide.

33. A method in accordance with claim 32 in which said polysulfide is sodium polysufide.

34. That method of producing electric current comprising providing a cell containing a lithium electrode, a hydrogen electrode and anhydrous LiCl—LiF eutectic as the electrolyte, said electrodes being in contact with said electrolyte, and passing hydrogen from its electrode into said electrolyte at lithium hydride forming temperature whereby lithium is converted to its hydride with development of an E.M.F.

35. That method of producing electric current comprising providing a cell containing a lithium electrode, a hydrogen electrode and anhydrous LiF—LiCl eutectic as the electrolyte, said electrolyte being at a temperature of about 450° C., said electrodes being in contact with said electrolyte, passing hydrogen into said electrolyte whereby said lithium is converted to lithium hydride with development of an E.M.F., withdrawing electrolyte carrying said lithium hydride and heating it to about 850° C. whereby said hydride decomposes into lithium and hydrogen, returning the resulting hydrogen and lithium to their respective electrodes, and returning the electrolyte to the cell after cooling it to cell operating temperature.

References Cited in the file of this patent

UNITED STATES PATENTS

| 344,345 | Case | June 29, 1886 |
| 567,721 | Payson | Sept. 15, 1895 |
| 895,715 | Basset | Aug. 11, 1908 |
| 1,323,879 | Libby | Dec. 2, 1919 |
| 2,901,522 | Bopp | Aug. 25, 1959 |

FOREIGN PATENTS

| 457 | Great Britain | Jan. 13, 1885 |
| 7,375 | Great Britain | Mar. 27, 1906 |